3,595,828
3-PHENYL-2-PROPEN-1-ONES AND 3-PHENYL-1-PROPANONES AS BIOSTATS IN PLASTICS, PAINTS AND TEXTILES

Christian H. Stapfer, Newtown, Pa., assignor to Carlisle Chemical Works, Inc., Reading, Ohio
No Drawing. Filed July 25, 1969, Ser. No. 845,025
Int. Cl. C08f *45/64;* C08k *1/76;* C09d *5/14*
U.S. Cl. 260—45.7      10 Claims

ABSTRACT OF THE DISCLOSURE 3-phenyl-2-propen-1-ones having the formula:

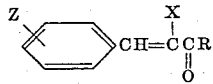

and/or 3-phenyl-1-propanones having the formula:

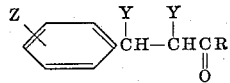

wherein R is alkyl, aryl, aralkyl, alkaryl or alkoxyaryl; X is hydrogen, chlorine or bromine; Y is chlorine or bromine; and Z is hydrogen, halogen, alkyl or aryl, are used as active biostats for the protection of poly(vinyl halide) formulations as well as other plastic compositions, textiles, coating compositions and paint compositions against fungi and bacteria.

---

This invention relates to the protection of plasticized poly(vinyl halide) formulations as well as other plastics, paints, coatings and textiles against the detrimental effects of microorganisms.

It is well known that a number of fungi and bacteria may cause rapid deterioration of valuable commodities exposed to environments favorable to the growth of these microorganisms.

Thus, the use of plasticized poly(vinyl chloride) compositions is sometimes limited in various applications because of the sensitivity of many of the ingredients entering the composition of such formulations towards microorganisms.

Bacterial contamination causes the deterioration of many plastic, paint and coating compositions and textiles (cellulosic and synthetic) are known to be very sensitive to a wide variety of microorganisms.

In order to obviate these deleterious effects, the industry is using various organic and organometallic compounds which, once introduced into the respective formulations, protect them more or less efficiently against bacteria and fungi. However, most products presently available have the inconvenience of being either toxic to humans or very expensive, or both.

We have found that 3-phenyl-2-propen-1-ones, which include the chalcones, having the formula:

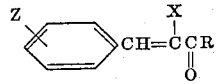

and the 3-phenyl-1-propanones, which include the chalcone halides, having the formula:

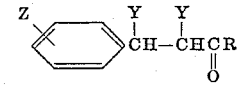

constitute active microbiostats for plastics, textiles, paints and coatings. In the above formulas, R is selected from the class consisting of hydrogen, alkyl having 1 to 8, preferably 1 to 4, carbon atoms, such as, methyl, ethyl, propyl, iso-butyl, pentyl, hexyl, heptyl and octyl, aryl having 6 to 18, preferably 6 to 10, carbon atoms, such as, phenyl, naphthyl, and the like, aralkyl having 7 to 18, preferably 7 to 10, carbon atoms, such as, benzyl, phenylethyl, tolylethyl, phenylpropyl and the like, alkaryl having 7 to 18, preferably 7 to 10, carbon atoms, such as, tolyl, xylyl, nonylphenyl, n-hexylphenyl and the like, X is selected from the class consisting of hydrogen, chlorine and bromine; and alkoxyaryl having 7 to 18, preferably 7 to 12, carbon atoms, such as, 3-methoxyphenyl, 4-butoxyphenyl and the like; Y is a halogen selected from the class consisting of chlorine and bromine; and Z is selected from the class consisting of hydrogen, halogen, preferably chlorine and bromine, alkyl as described above for R and aryl as described above for R. R, X, Y and Z may be the same or different in the same molecule and mixtures of such compounds can be used herein.

The compounds described by the above formulas are generically referred to herein as 3-phenyl-2-propen-1-ones and 3-phenyl-1-propanones and include 1,3-diphenyl-2,3-dibromo-1-propanone, 1-methyl-2-bromo-3-phenyl-2-propen-1-one, 1,3-diphenyl-2-propen-1-one (chalcone), 1-methyl-3-phenyl-2-propen-1-one (benzalacetone), 1-butyl-3-phenyl-2-propen-1-one, 1-benzyl-3-tolyl-2-propen-1-one, 1-xylyl-3-benzyl-2-propen-1-one, 1-(3-butoxyphenyl)-3-(2-chlorophenyl) 2 - propen - 1 - one, 1 - (n - hexylphenyl)-3-(4-chlorophenyl)-2-propen-1-one, 1-tolyl-3-(2-methoxyphenyl)-2-propen-1-one, 1-(4-methoxyphenyl)-3-(3-bromophenyl) - 2 - propen - 1 - one, 1 - methyl - 2 - bromo-3 - (3 - methylphenyl) - 2 propen - 1 - one, 1 - phenyl-2,3 - dichloro - 3 - phenyl- 1 propanone, 3 - phenyl-2 - propen - 1 - one, 1 - methyl - 2,3 - dichloro - 3 - xylyl-2 - propanone, 1 - octyl - 2,3 - dichloro - 3 - (3 - chlorophenyl) - 2 - propanone, 1 - phenylethyl - 2,3 - dibromo-3 - (4 - propylphenyl) - 2 - propanone, 1 - (n - hexylphenyl) - 2,3 - dibromo - 3 - biphenylyl - 2 - propanone, 1 - (3 - propoxyphenyl) - 2,3 - dichloro - 3 - butyl - 2-propanone and the like. Each of these compounds when substituted on a mol for mol basis for the 3-phenyl-2-propen-1-one or 3-phenyl-1-propanone used in the examples below provides similar microbiostatic effects.

These compounds are prepared easily by classic synthetic methods known to the art and can be made quite inexpensively. For example, benzaldehyde or substituted benzaldehyde, $ZC_6H_4C(O)H$, is condensed with a ketone, $H_2C(X)C(O)R$, on a mol for mol basis under alkaline conditions at a temperature ranging from 20° C. to 100° C. to produce the 3-phenyl-2-propen-1-ones. An excess of the ketone can be used and sodium hydroxide is a useful catalyst. The reaction can be carried out in the presence of a suitable solvent, such as, methanol, ethanol, or butanol. The 3-phenyl-2-propen-1-one is conveniently recovered by filtration. The 3-phenyl-1-propanones can be made by halogenating, i.e., with bromine or chlorine, or by hydro-halogenating, i.e., with HBr or HCl the 3-phenyl- 2-propen-1-one, using a temperature in the range of 20° C. to 100° C. with or without a catalyst in a solvent medium, e.g., methanol, ethanol, butanol and the like. The 3-phenyl-1-propanone is conveniently separated by filtration.

The recommended usage levels for protection of flexible PVC as well as paints and textiles may vary between about 0.01 and about 10%, preferably about 0.02 to about 1, of the microbiostat based on the weight of the polymeric composition or substrate. Higher amounts can be used although no commensurate increase in protective effect is believed to be obtained.

The harmful effects of microbiological deterioration are due, of course, to the action of microorganisms such as bacteria and fungi on the polymeric composition, particularly on various modifiers commonly added to polymeric compositions, such as, organic glycols including ethylene glycol, propylene glycol, polyoxyethylene glycols, polyoxypropylene glycols, polyoxyethyleneoxypropylene glycols, and the like; monohydrocarbyl and dihydrocarbyl ethers of polyalkylene glycols, e.g., monoethyl, monobutyl, monophenyl, diethyl, dimonyl, di-isobutyl ethers of polyethylene glycol, and the like; organic esters including dioctyl phthalate, diethyl sebacate, octyl decyl adipate, and the like, epoxidized soybean oils, cellulosic derivatives, including carboxymethylcellulose, hydroxyethylcellulose, methyl cellulose, hydroxyethylated starch, ethyl cellulose and the like, and in general the plasticizers listed on pages 18 through 45, and other plastic additives described in Modern Plastics Encyclopedia for 1964, New York, N.Y. These additives are conventionally used in amounts of about 5% to 80% by weight of the polymeric composition and provide ideal nutrients for microorganisms.

My investigations have shown the 3-phenyl-2-propen-1-one or 3-phenyl-1-propanone to be effective against such microorganisms regardless of the type of polymeric composition or the ingredients contained by it. Thus, the present invention can be applied to any polymeric composition which is subject to attack by microorganisms and which is otherwise inert to the 3-phenyl-2-propen-1-one or 3-phenyl-1-propanone. Typical polymeric compositions to which this invention applies include poly(vinyl halide) resins, such as, plasticized poly(vinyl chloride) homopolymers, copolymers of vinyl chloride with other ethylenically unsaturated compounds such as vinyl acetate, polyolefins such as polyethylene, polystyrene, ABS copolymers, polyesters, epoxy resins, nitrocellulose resins, vinyl acetate-alkyl acrylate copolymers, vinyl acetate-acrylic acid copolymers, butadiene-styrene copolymers, butadiene-acrylonitrile copolymers, cellulosic fibers including 100% cotton fibers; synthetic fibers such as polyester, polyacrylonitrile and/or acetate rayon fibers, cellulosic fibers in the form of blends of cotton fibers and synthetic fibers such as those listed above, papermaking fibers and the like. The fibers mentioned above may be in any special form such as textile yarn, woven or knitted textile fabrics, paper or the rawstock forms of same.

The inclusion of the 3-phenyl-2-propen-1-one or 3-phenyl-1-propanone microbiostats in the polymeric composition can be carried out in any convenient manner. When thermoplastic polymers are involved, it is convenient to heat or melt the polymer and mill the microbiostat into it. When thermosetting polymers are involved, it is most convenient to mix the microbiostat into the polymer-forming monomers before curing into the thermoset condition. When fiber, yarn, fabric or paper is concerned, it is convenient to impregnate such substrates with a solution of the microbiostat in such solvents as methyl ethyl ketone, dimethyl, formamide, tetrahydrofurane, and the like and then dry the impregnated substrate to remove the solvent.

The following examples are presented. In these examples all parts and percentages are on a weight basis, mols are on a gram-mol basis and temperatures are on the Fahrenheit scale.

EXAMPLE 1

To flexible polyvinyl chloride formulations comprising 100 g. of a general purpose poly(vinyl chloride) suspension resin (Geon 101 EP, manufactured by the B. F. Goodrich Co.), 25 g. of dioctyl phthalate plasticizer, 25 g. of epoxidized soybean oil plasticizer, 0.5 g. of stearic acid and 2.0 g. of a barium-cadmium stabilizer, was introduced respectively 0.25, 0.5 and 1.0 g. of the microbiostats listed in Table I below. The blends were then processed on a two roll mill for five minutes at 320° F. 1¼ in. square specimens were cut and tested according to Federal Test Method Standard No. 406, Method 6091 (Oct. 5, 1961). In this method, the specimens were placed on nutrient salts agar comprising 1.0 g. of ammonium nitrate, 0.7 g. of potassium dihydrogen phosphate, 0.7 g. of potassium monohydrogen phosphate, 1.0 g. of magnesium sulfate, 0.005 g. of sodium chloride, 0.001 g. of manganese sulfate, 0.002 g. of zinc sulfate, 0.002 g. of iron sulfate, 15 g. of agar and 1000 ml. of distilled water. The surfaces of the agar and specimens were then inoculated with a composite spore suspension consisting of *Aspergillus niger, Aspergillus flavus, Penicillium funiculosum* and *Trichoderma* sp. The samples were incubated for 21 days at 30° C. and compared for failure to an unprotected sample containing no microbiostat.

The above-mentioned Federal specification considers a biostat as satisfactory in the above-described test if no fungus growth is observed on the samples after 21 days of incubation. Presence of fungus growth after 16 days constitutes a failure to protect the sample adequately.

The results are listed in Table I.

TABLE I

| Microbiostat | Grams of biostat | Failed | Passed |
|---|---|---|---|
| None (control) | | 16 days | |
| 1,3-diphenyl-2-propen-1-one | 0.25 | | 21 days. |
| Do | 0.5 | | Do. |
| Do | 1.0 | | Do. |
| 1,3-diphenyl-2,3-dibromo-1-propanone | 0.25 | | Do. |
| Do | 0.5 | | Do. |
| Do | 1.0 | | Do. |
| 1-methyl-2-bromo-3-phenyl-2-propen-1-one | 0.25 | | Do. |
| Do | 0.5 | | Do. |
| Do | 1.0 | | Do. |

EXAMPLE 2

One ml. of a one to two day old mixed culture of *Enterobacter aerogenes, Pseudomonas aeroginosa, Bacillus subtilis* and *Escherichia coli* was inoculated into 50 g. of three test coatings as identified below containing respectively for each coating 0.03, 0.06, 0.08, 0.1, 0.2, 0.3 and 0.4 percent (by weight of coating) of the microbiostats listed in Table II below.

Small aliquots of each resulting coating were transferred to solid agar plates prepared by casting and dehydrating a mixture of 1000 ml. of distilled water, 23 g. of nutrient agar, 8 g. of nutrient broth and a trace of sodium chloride. The plates were cross-hatched with each coating. The plates were then incubated at 30° C. until they showed heavy growth or until two weeks elapsed, whichever came first. The plates were inspected for growth at intervals of 1, 4, 24 and 48 hours and were cross-hatched with each coating after each inspection.

If no growth appears at the 1 and 4 hour intervals, the performance is considered to be excellent. If growth appears at the 1 and 4 hour intervals but no further growth is observed between 4 and 24 hours, the performance is considered to be good. If further growth is observed at the 24 hour inspection, performance is unsatisfactory. The interval within which no further growth is observed is termed the "return to sterility." Table II summarizes the performance of the microbiostat in respectively a (1) poly(vinyl acetate) polymer (polymer of 4 wt. parts vinyl acetate and 1 wt. part dibutyl phthalate and maleate such as Flexbond 800, manufactured by the Airco Corp.), (2)

a polyacrylate (polymer of 1 wt. part methyl methacrylate and 2 wt. parts ethyl or hexyl acrylate such as Rhoplex AC 34, manufactured by the Rohm & Haas Co.) and (3) a styrene-butadiene copolymer (60 to 80 wt. percent styrene and 20 to 40 wt. percent butadiene such as Dow Chemical's Latex 307 W).

TABLE II

| Coating | Microbiostat | Percent microbiostat | Hours returned to sterility | Rating |
|---|---|---|---|---|
| 1 | 1,3-diphenyl-2-propen-1-one. | 0.1-0.4 | 24 | Good. |
| 1 | 1,3-diphenyl-2,3-dibromo-1-propanone. | 0.08-0.4 | 24 | Do. |
| 2 | 1,3-diphenyl-2-propen-1-one. | 0.06-0.1 | 24 | Do. |
| 2 | do | 0.2-0.4 | 4 | Excellent. |
| 2 | 1,3-diphenyl-2,3-dibromo-1-propanone. | 0.06-0.2 | 24 | Good. |
| 2 | do | 0.3-0.4 | 4 | Excellent. |
| 3 | 1,3-diphenyl-2-propen-1-one. | 0.1-0.4 | 24 | Good. |
| 3 | 1,3-diphenyl-2,3-dibromo-1-propanone. | 0.2-0.4 | 24 | Do. |

As a comparison, an unprotected sample shows further growth at the end of each interval up to and including the 48 hour interval.

The following formulations illustrate the ingredients present in polymers 1, 2 and 3:

COATING 1

|  | Pounds | Grams |
|---|---|---|
| Methylcellulose, 2%, 4,000 cps | .90 |  |
| Tamol 731 (surfactant) |  | 13.6 |
| Ethylene glycol | .12 |  |
| Titanium dioxide | 1.65 |  |
| Asbestos 3X | .51 |  |
| 325 mesh mica | .3 |  |
| Water | 1.2 |  |
| Diethylene glycol monoethyl ether |  | 43.6 |
| Igepal CO 630 (surfactant) |  | 8.17 |
| Anti-foam (1.1 in H₂O) |  | 4 |
| Flexbond 800 | 2.35 |  |

COATING 2

|  | Pounds | Grams |
|---|---|---|
| Water | .96 |  |
| Triton CF-10 (surfactant) |  | 8.2 |
| Tamol 731 (surfactant) |  | 27.2 |
| Titanium dioxide | 1.05 |  |
| Calcium carbonate (Atomite) | 2.25 |  |
| Ammonium hydroxide 28% |  | 3 |
| Ethylene glycol | .18 |  |
| Methylcellulose, 2%, 4,000 cps | .61 |  |
| Rhoplex AC-34 | 2.14 |  |

COATING 3

|  | Pounds | Grams |
|---|---|---|
| Water | .945 |  |
| Tamol 731 (surfactant) |  | 12.7 |
| Polyglycol P-1200 |  | 9.1 |
| Titanium dioxide | 1.61 |  |
| Clay | .52 |  |
| Calcium carbonate | 1.05 |  |
| Diethylene glycol | .11 |  |
| Methylcellulose, 4,000 cps. (2%) | 1.4 |  |
| Advawet #33 (surfactant) |  | 37.8 |
| Ammonium hydroxide 28% |  | 7 |
| Dow latex 307 W | 2.1 |  |

EXAMPLE 3

When each of 1-methyl-3-phenyl-2-propen-1-one (benzalacetone),
1-butyl-3-phenyl-2-propen-1-one,
1-benzyl-3-tolyl-2-propen-1-one,
1-xylyl-3-benzyl-2-propen-1-one,
1-(3-butoxyphenyl)-3-(2-chlorophenyl)-2-propen-1-one,
1-(n-hexylphenyl)-3-(4-chlorophenyl)-2-propen-1-one,
1-tolyl-3-(2-methoxyphenyl)-2-propen-1-one,
1-(4-methoxyphenyl)-3-(3-bromophenyl)-2-propen-1-one,
1-methyl-2-bromo-3-(3-methylphenyl)-2-propen-1-one,
1-phenyl-2,3-dichloro-3-phenyl-1-propanone,
3-phenyl-2-propen-1-one,
1-methyl-2,3-dichloro-3-xylyl-2-propanone,
1-octyl-2,3-dichloro-3-(3-chlorophenyl)-2-propanone,
1-phenylethyl-2,3-dibromo-3-(4-propylphenyl)-2-propanone,
1-(n-hexylphenyl)-2,3-dibromo-3-biphenylyl-2-propanone,
1-(3-propoxyphenyl)-2,3-dichloro-3-butyl-2-propanone is substituted mol for mol for the microbiostats in Examples 1 and 2, there results substantially the same microorganism inhibiting effect as obtained in Examples 1 and 2, respectively. Also, when each of these above-named 3-phenyl-2-propen-1-ones and 3-phenyl-1-propanones is applied to cellulosic fabric from solution in tetrahydrofurane and dried, there results excellent inhibiting effects as against the microorganisms identified in Examples 1 and 2.

What is claimed is:

1. A polymeric composition containing ingredients sensitive to attack of bacteria which includes, as a protective agent against attack by said microorganisms, about 0.01 to about 10 wt. percent based on the weight of said polymeric composition, of a microbiostat selected from the class consisting of 3-phenyl-2-propen-1-ones having the formula:

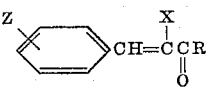

and 3-phenyl-1-propanones having the formula:

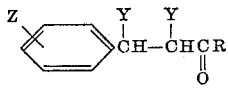

wherein R is selected from the class consisting of hydrogen, alkyl having 1 to 8 carbon atoms, aryl having 6 to 18 carbon atoms, aralkyl having 7 to 14 carbon atoms, alkaryl having 7 to 18 carbon atoms; X is selected from the class consisting of hydrogen, chlorine and bromine; Y is selected from the class consisting of bromine and chlorine and Z is selected from the class consisting of hydrogen, halogen, alkyl having 1 to 8 carbon atoms, and aryl having 6 to 18 carbon atoms.

2. A polymeric composition as claimed in claim 1 wherein said microbiostat is 1,3-diphenyl-2-propen-1-one and said polymeric composition is a synthetic polymer composition.

3. A polymeric composition as claimed in claim 2 wherein said polymeric composition is plasticized poly(vinyl chloride) composition.

4. A polymeric composition as claimed in claim 2 wherein said siad polymeric composition is styrene-butadiene copolymer composition.

5. A polymeric composition as claimed in claim 2 wherein said polymeric composition is vinyl acetate-acrylic copolymer composition.

6. A polymeric composition as claimed in claim 1 wherein said microbiostat is 1,3-diphenyl-2,3-dibromo-1-propanone.

7. A polymeric composition as claimed in claim 6 wherein said polymeric composition is plasticized poly(vinyl chloride) composition.

8. A polymeric composition as claimed in claim 6 wherein said polymeric composition is styrene-butadiene copolymer composition.

9. A polymeric composition as claimed in claim 6 wherein said polymeric composition is vinyl acetate-acrylic copolymer composition.

10. A polymeric composition as claimed in claim 1 wherein said microbiostat is 1-methyl-2-bromo-3-phenyl- 2-propen-1-one and said polymeric composition is plasticized poly(vinyl chloride) composition.

References Cited

UNITED STATES PATENTS

| | | | |
|---|---|---|---|
| 2,212,529 | 8/1940 | Swaine | 424—331 |
| 2,532,558 | 12/1950 | Kirby | 424—331 |
| 2,632,746 | 3/1953 | Darby | 260—23 |
| 2,805,184 | 9/1957 | Clark | 424—331 |
| 2,956,973 | 10/1960 | Holdsworth | 260—29.6 |
| 3,154,518 | 10/1964 | Gradsten et al. | 260—45.9 |
| 3,214,453 | 10/1965 | Stern, Jr. | 260—429.7 |
| 3,308,082 | 3/1967 | Pauli et al. | 260—29.5 |
| 3,445,249 | 5/1969 | Leebrick | 106—15 |

OTHER REFERENCES

Cromwell et al.: J.A.C.S., vol. 65, 1943, pp. 301 and 302.

Lutz et al.: J.A.C.S., vol. 73, 1951, pp. 4647–4652.

DONALD E. CZAJA, Primary Examiner

R. A. WHITE, Assistant Examiner

U.S. Cl. X.R.

106—15AF; 117—138.5; 260—29.6R, 29.7R

Disclaimer 3,595,828.—*Christian H. Stapfer*, Newtown, Pa. 3-PHENYL-2-PROPEN-1-ONES AND 3-PHENYL-1-PROPANONES AS BIOSTATS IN PLASTICS, PAINTS AND TEXTILES. Patent dated July 27, 1971. Disclaimer filed Oct. 16, 1972, by the assignee, *Cincinnati Milacron Chemicals, Inc.*

Hereby enters this disclaimer to claim 6 of said patent.

[*Official Gazette April 24, 1973.*]